(12) United States Patent
Giordano

(10) Patent No.: US 6,578,601 B2
(45) Date of Patent: Jun. 17, 2003

(54) LIQUID PRESSURE REGULATOR

(76) Inventor: Daniel Héctor Giordano, Lavalle 307, Tigre, Buenos Aires (AR)

( * ) Notice: Subject to any disclaimer, the term of this patent is extended or adjusted under 35 U.S.C. 154(b) by 26 days.

(21) Appl. No.: 09/950,482

(22) Filed: Sep. 10, 2001

(65) Prior Publication Data

US 2002/0029806 A1 Mar. 14, 2002

(30) Foreign Application Priority Data

Sep. 11, 2000 (AG) .......................................... 000104751
Aug. 31, 2001 (AG) .......................................... 010104164

(51) Int. Cl.$^7$ ................................................ G05D 16/10
(52) U.S. Cl. ................................. 137/505.18; 137/509
(58) Field of Search ................................. 137/505, 509, 137/505.18

(56) References Cited

U.S. PATENT DOCUMENTS 2,888,033 A    5/1959  Eickmeyer ................... 137/505
3,324,873 A  * 6/1967  Trombatore et al. ... 137/505.18
4,474,207 A   10/1984  Rosenberg ................... 137/505
4,543,985 A   10/1985  Healy et al. ............ 137/505.25
5,257,646 A   11/1993  Meyer .................... 137/505.25
5,875,815 A    3/1999  Ungerecht et al. ...... 137/505.25
5,881,757 A  * 3/1999  Kuster et al. .......... 137/505.25

* cited by examiner

*Primary Examiner*—Stephen M. Hepperle
(74) *Attorney, Agent, or Firm*—Emrich & Dithmar

(57) ABSTRACT

A liquid pressure regulator assembly includes an inlet portion through which the liquid enters the regulator assembly. The inlet portion includes a piston member which is engageable with a plunger portion. A housing portion encloses the plunger portion and is sealingly engageable with the inlet portion. The housing defines passageways for the liquid to pass through the regulator assembly. A spring member located between said inlet portion and said plunger portion biases the plunger portion to an operating position away from said inlet portion to permit liquid to flow through the assembly. Separated support members are provided between the piston member and the plunger portion to permit axial movement of the plunger portion relative to the inlet portion to predeterminely control the flow of liquid through the regulator assembly.

11 Claims, 6 Drawing Sheets

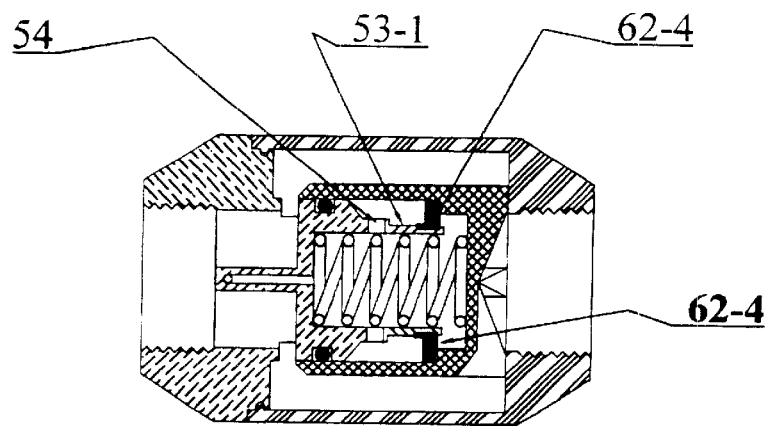
FIG. 6
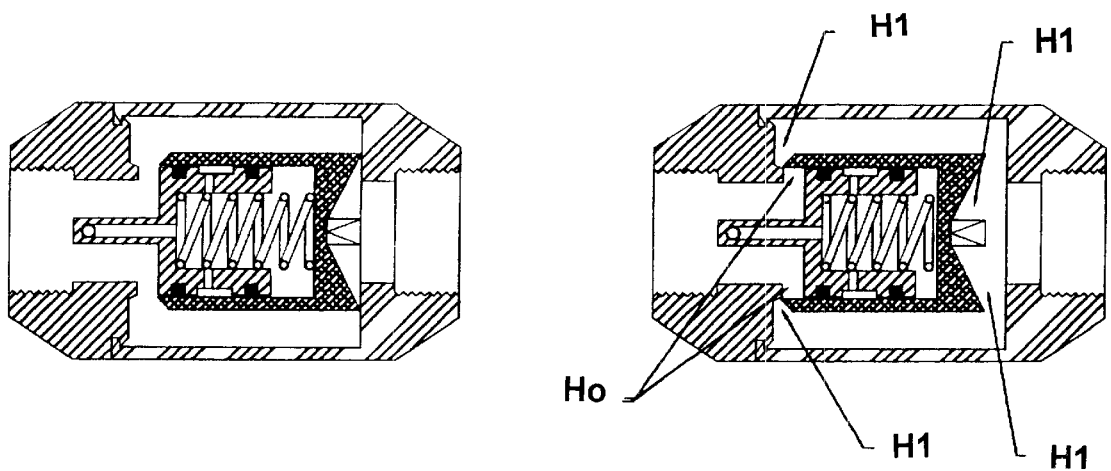
FIG. 7  FIG. 7a

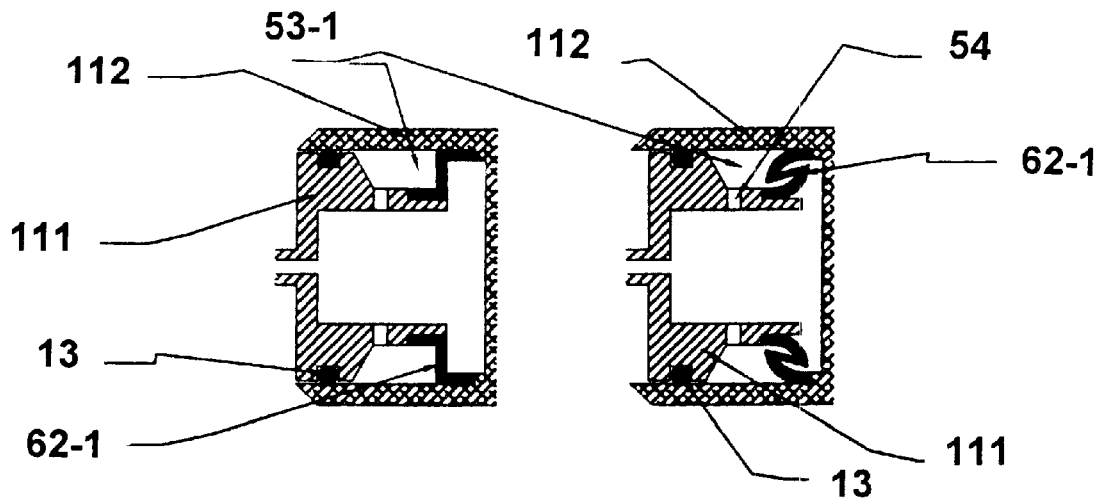
FIG. 11  FIG. 11a
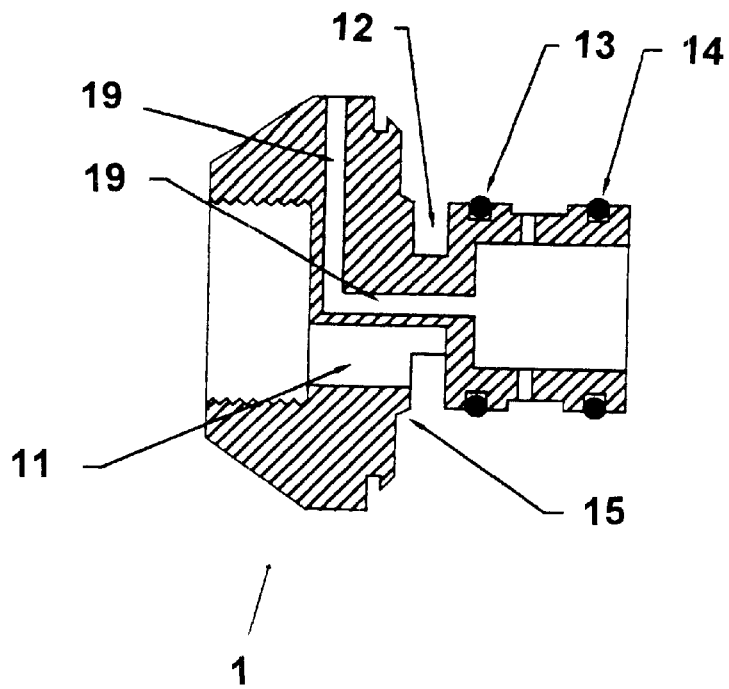
FIG. 12

LIQUID PRESSURE REGULATOR

SUMMARY OF THE INVENTION

The present invention relates to a liquid pressure regulator of the type that is used in liquid conducting systems such as irrigation equipment. The pressure regulator of the present invention maintains the pressure in the outlet of the regulator relatively constant, regardless of the pressure in the inlet.

The pressure regulator of the present invention is formed by a total of six pieces which include three main pieces and three accessories. The three main pieces include an inlet piece, an intermediate piece having a plunger which moves over a piston fixed to the previous piece, and an outlet piece which encloses the intermediate piece. The three accessories include a seal, a supportive element and a spring.

The pressure regulator of the present invention includes a double enclosing cone which makes it extremely effective. The regulator includes two or more supports between the plunger and the fixed piston which results in a coaxial sliding with respect to one another. The spaces formed between the front supports communicate with the atmosphere. These improvements ensure that the present invention is a simple pressure regulator with few and inexpensive pieces, but at the same time is highly effective.

BACKGROUND OF THE INVENTION

The pressure regulators most frequently used today differ substantially from the present invention, as shown in the prior art regulators described in U.S. Pat. No. 4,543,985, U.S. Pat. No. 5,257,646 and U.S. Pat. No. 5,875,815. The technical differences between the prior art regulators and the present invention are primarily provided by the location where the regulation of the pressure is produced.

In the prior art regulators, the liquid enters through the center and is directed to the periphery by means of a deflector star which immediately diverts to the center where the regulation takes place. During the first step, the central flow moves to the periphery, and in the second step, this same flow moves from the periphery back to the center where the regulation takes place. However, these prior art regulators are significantly more complex than the present invention because they have, on average, a total of at least 18 components.

In the present invention, regulation takes place during the first step when the flow moves from the center to the periphery of the regulator. The flow moves back to the center only when leaving the device. This permits the present invention to be significantly less complicated and less costly than the prior art regulators while being highly effective and efficient.

Prior art regulators are disclosed in U.S. Pat. No. 4,474,207 and U.S. Pat. No. 2,888,033. The regulators of these patents are not frequently used today because they provide inaccurate pressure regulation due to the non-coaxial sliding of the intermediate cylindrical piece with respect to the inlet piece and due to the point of contact between the plunger and the inlet piece being flat on both pieces.

Another important factor affecting inaccuracy is that because there is a single supporting point between the plunger and the fixed piston, the axis of the plunger is unstable and, therefore, it does not move in a coaxial manner with respect to the fixed piston of the inlet piece. This produces lateral movements or inclination. Thus, the non-coaxial movement of the cylindrical piece produces a lack of accuracy of the regulator and a high level of hysteresis.

With respect to the lack of accuracy of this type of regulator, when the axis of the plunger does not have a coaxial and aligned position with respect to the axis of the piston, the closing of the plunger over the inlet piece is not consistent around the entire perimeter and, therefore, there are pressure leaks from the inlet to the outlet resulting in the regulator being inaccurate. Further, these differences are not constant, so for the same inlet pressure, there are different outlet pressures and, therefore, inaccuracy results.

With respect to hysteresis, hysteresis may be observed when the performance of the regulator is represented on a graph in which the x-axis is the inlet pressure of the regulator and the y-axis the outlet pressure of the regulator. Two curves are obtained as the inlet pressure is varied. One curve results from the increase of the inlet pressure while the other curve is obtained as this pressure decreases. The difference between these two curves is called hysteresis, as shown in Graph No. 1. The upper curve was obtained by increasing the pressure in the inlet of the regulator, while the lower curve was obtained while decreasing the pressure in the inlet of the regulator. All pressure regulators have hysteresis, but the lower the hysteresis, the more efficient the regulator will be.

However, when the movement between the plunger and the piston is not coaxial, it is difficult for the plunger to return to its original position, thus increasing the hysteresis of the regulator. To overcome these problems, U.S. Pat. No. 2,888,033 has a screw which fixes the position of the plunger, consequently causing an inclination of this piece from its initial position. Also, U.S. Pat. No. 4,474,207 discloses the use of additional ribs on the housing. These ribs should have very little space (almost none) over the plunger to be effective, a structure which increases the level of hysteresis. However, if a larger space is left to decrease the level of hysteresis, lateral movements cannot be avoided.

Also, the surfaces of contact between the plunger and the inlet piece of the present invention are flat. U.S. Pat. Nos. 4,474,207 and 2,888,033 share this structural characteristic. The problem of accuracy occurs when flow is low because there needs to be a small and accurate closing. In this operating condition, it is found that the change of pressure from the inlet to the outlet pressure does not occur in a single point. This change in pressure occurs throughout the thickness of the plunger. This means that there is an inlet pressure on one side of the plunger and an outlet pressure on the other. Consequently, if the closing is flat, the decrease of pressure from the inlet to the outlet is progressive throughout the length or thickness of that plane. This means that there is an intermediate pressure between the inlet pressure and the outlet pressure and, logically, this intermediate pressure is directly proportional to the inlet pressure because the higher the inlet pressure is, the higher the intermediate pressure will be.

It is important to consider that the surface of the plunger which produces the opposing force of the spring is its exterior surface, without considering the surface of the thickness, since this surface receives pressure from both sides. Because the surface of the thickness is below the intermediate pressure, which varies and is affected directly by the inlet pressure, the opposing force of the regulation spring decreases with the increase of the inlet pressure. Thus, theoretically, the outlet pressure on the other side of the plunger is constant. In this manner, the regulation is ineffective and increases the level of hysteresis. With high flow, where the closing should not be narrow, this effect is not very important, even though it exists. However, its presence with low flow is significant.

Another problem of the structure of U.S. Pat. No. 4,474,207 is that the teeth, which position the plunger, must have sufficient surface where they touch the housing. This significantly reduces the effective regulating surface in its initial position. Once there is enough outlet pressure, the housing moves and causes a sudden increase in the effective regulating surface. This causes a sudden increase of the opposing spring force which, in turn, further moves the plunger significantly and decreases the outlet pressure. When observing the outlet pressure curve of the regulators with this system, there are a slope and oscillations in the inlet pressure area near the pressure of regulation. This regulator, U.S. Pat. No. 4,474,207, also has five pieces and two accessories, problems and structures that have been solved by the present invention.

Two seals (o-rings) were added to correct the lateral movements or inclination of the plunger to assure that this piece maintains its coaxial position with respect to the fixed piston of the inlet piece. With this addition, the accuracy increased and the hysteresis decreased.

Eventually, if liquid should pass the first o-ring, it would be retained between the o-rings. The presence of this liquid would originate pressures which would prevent the normal movement of the cylindrical piece sideways and would therefore cause inaccuracy and an increase in the level of hysteresis. Also in the previous design, both planes of the closing between the inlet piece and the plunger were flat, therefore presenting the same problem mentioned before.

The present invention overcomes the problems of the prior art because the plunger slides over the first seal and a supportive element, but this does not work as a seal because it only supports the plunger. Because the plunger has two supporting points, it will always be in a coaxial position with respect to the piston over which it slides. Secondly, in the present invention the second support works as a support and not as a seal and does not retain liquids between the seal and the support because this space has been joined to the chamber formed between the intermediate cylindrical piece and the piston. This chamber is connected to the atmosphere to solve any problem of pressure build-up.

Concerning the flat surfaces of the closing planes, this problem was solved by the present invention by making both fronts conical. Thus, the closing is very efficient and the outlet pressure is leveled on both sides of the plunger which correspond to its thickness. When regulating the outlet pressure, the opposing spring force will always be constant. Also, in the regulator of the present invention, the point of support of the teeth of the cylindrical piece in the housing are small enough for their surface to be considered insignificant compared to the effective regulating surface, therefore not altering its work.

SUMMARY OF THE INVENTION

The present invention is a pressure regulating device for liquids consisting of three principal parts. The first part is an inlet through which the liquid enters and travels to the periphery of the device through internal tubes. This part includes a piston, which is fixed to it and over which slides a cylindrical plunger. This second part, the plunger, is closed at one end and has a toothed crown. The plunger slides over the piston fixed to the first part and by means of a sleeve, it opens and closes the internal conducts of the first part. This produces the regulation of the pressure of the outlet liquid. The third part, the housing, encloses the first and second parts. The third housing part forms a tube between itself and the second plunger part through which the liquid is led to the outlet of the regulator. The outlet is found on the third housing part.

The following accessory pieces complete the regulator of the present invention. A spring is situated between the inlet 1 and the intermediate or second part. The spring's force maintains both parts separated and it opposes the force generated by the outlet pressure and the surface of the enclosed internal face of the second part. A seal hermetically closes the chamber that is formed between the piston fixed to the first part and to the second part. Finally, there is a supportive element, which together with the seal mentioned before, ensures that the second plunger, slides over the piston fixed to the inlet in a coaxial manner.

DESCRIPTION OF THE DRAWINGS

FIG. 6 is a cross-sectional view of a pressure regulator assembly in accordance with a further embodiment of the present invention;

FIG. 7 is a cross-sectional view of the pressure regulator assembly illustrating the plunger portion in the open position in accordance with the present invention;

FIG. 7a is a cross-sectional view of the pressure regulator assembly illustrating the plunger portion in the closed position in accordance with the present invention;

It can be seen here how the outlet pressure opposes the two faces of the plunger (piece 2).

Figure 8:
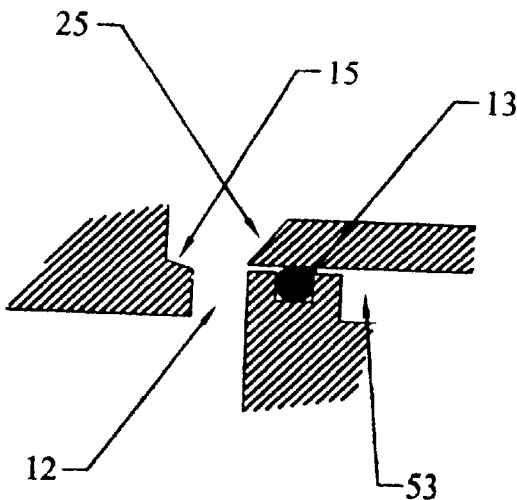
Figure 9:
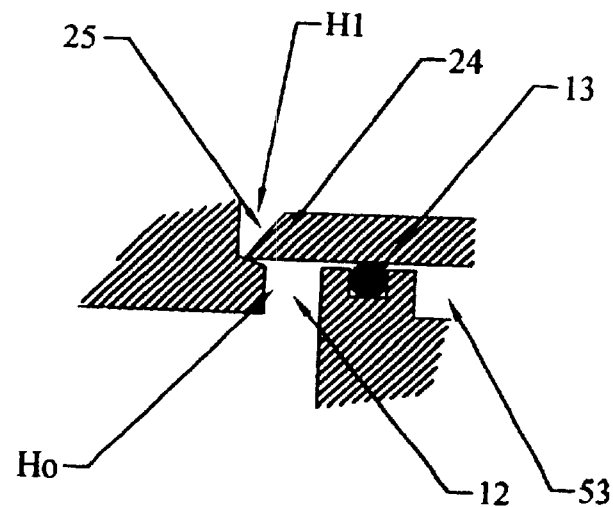
Figure 10:
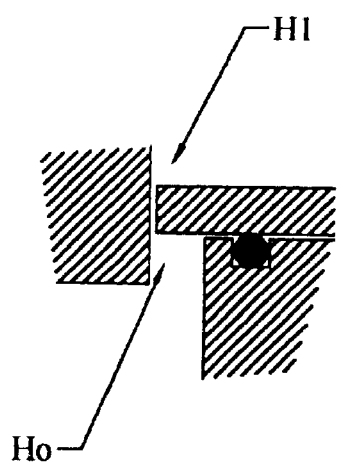

FIG. 8 is an enlarged partial sectional view illustrating the plunger in the open position and the passageway 12 unblocked in accordance with the present invention;

FIG. 9 is an enlarged partial sectional view illustrating the plunger in the closed position and the passageway 12 blocked in accordance with the present invention;

FIG. 10 is an enlarged partial sectional view illustrating the flat closing of the flow of a passageway.

FIGS. 11 and 11a are partial sectional views of the deformation of the S-shaped positioning elements or separators in accordance with the present invention; and FIG. 12 is an enlarged sectional view showing a tube ventilating the chamber between the inlet portion and the plunger portion in accordance with a further embodiment of the present invention.

Figure 13:
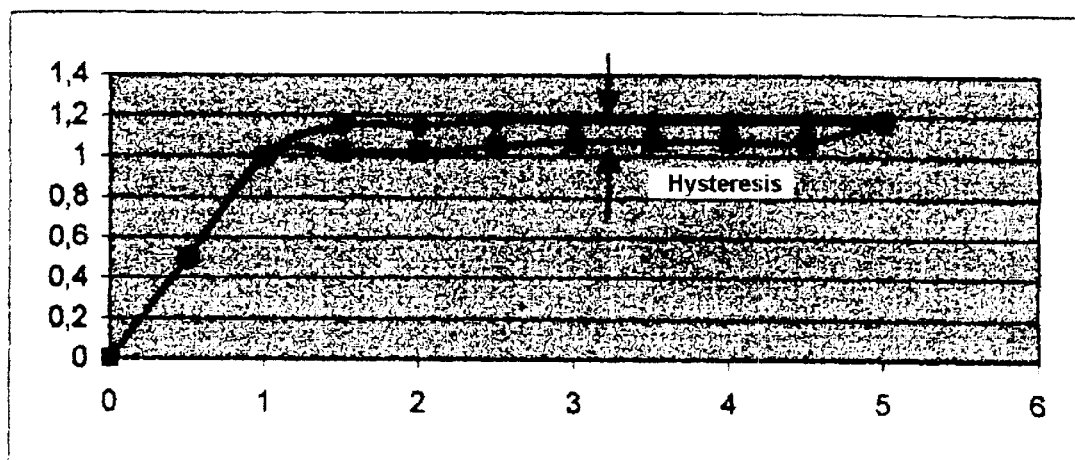

FIG. 13 illustrates the effect of hysteresis found within a prior art regulator device.

DETAILED DESCRIPTION OF THE INVENTION

Figure 1:
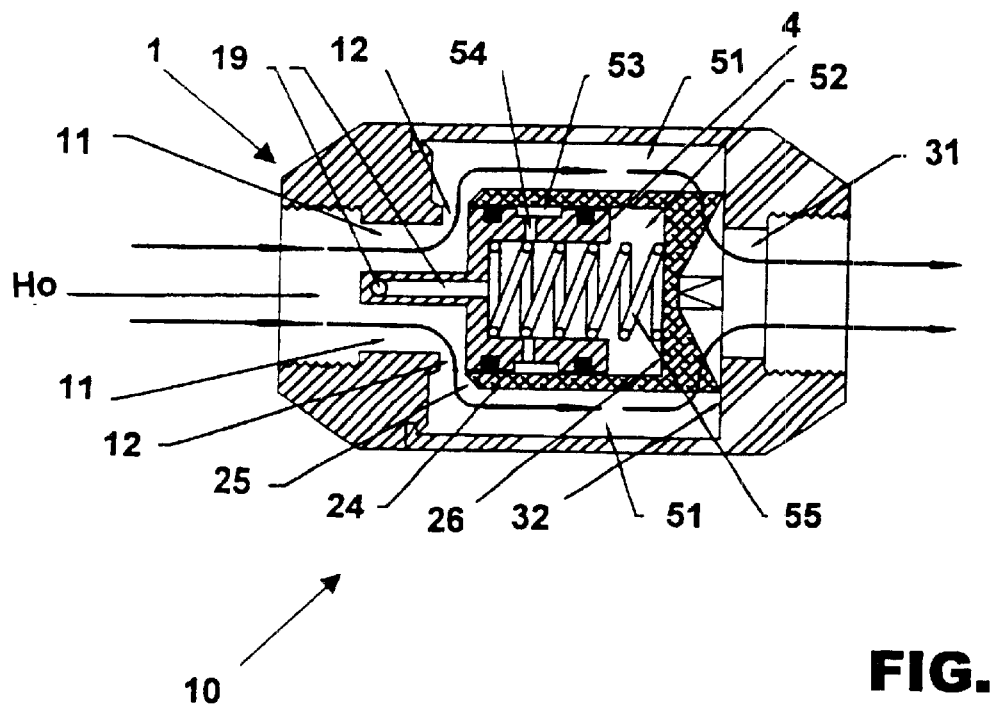
FIG. 1 is a cross-sectional view of the pressure regulator assembly in accordance with the present invention.
Figure 2:
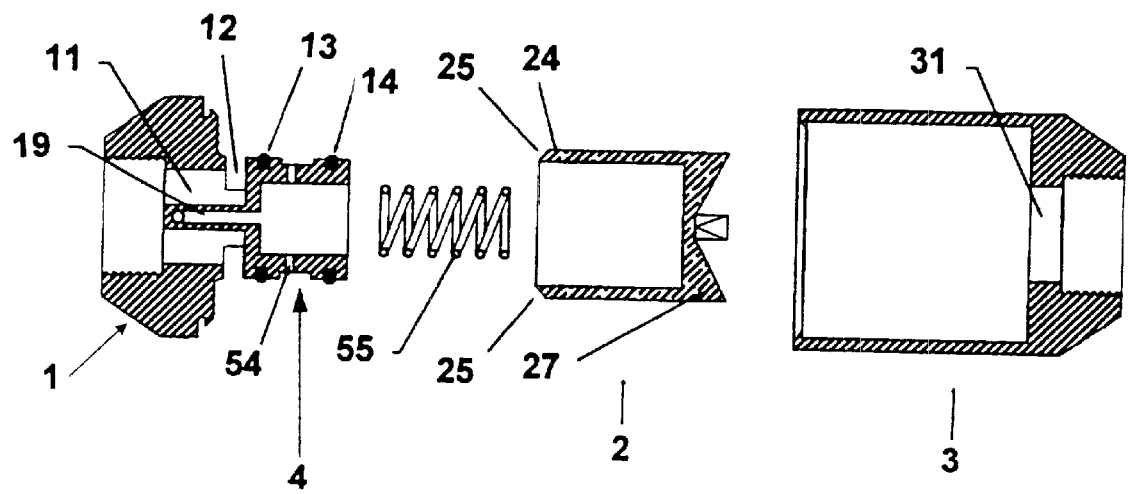
FIG. 2 is an exploded view of the pressure regulator assembly in accordance with FIG. 1.

FIGS. 1 and 2 illustrate how the pressure regulator assembly 10 of the present invention operates. The liquid enters the device through the inlet piece 1, as shown by the arrows. It reaches the periphery of the regulator as it passes through tubes or passageways 11 and 12 and passes continuously through tubes or passageways 51, formed between the plunger part, piece or portion 2 and the housing part, piece or position 3 and then reaches the exit formed by tube 31 of the housing.

The inlet piece 1 includes a fixed piston 4 structurally arranged to slide within plunger piece 2. The plunger piece 2 can close and block tubes 12 of the inlet piece by means of its sleeve 24, as shown in FIG. 9. Between the inlet part 1 and the plunger part 2 a spring 55 is positioned which maintains the plunger part 2 the furthest distance possible from the inlet piece 1. The tubes 11 and 12 of the inlet piece are at their maximum opening when pieces 1 and 2 are at their maximum separation, as shown in FIGS. 1 and 8.

The outlet pressure with the internal surface (regulating surface) of the plunger portion 2 forms a force (outlet force) opposed to the force of the spring 55. The internal surface must be considered since the surface of the thickness of the plunger receives pressure from both sides. While a pressure inferior to the nominal regulation enters the regulator, the force of the spring 55 prevails over the outlet force. This maintains the plunger portion 2 away from the inlet portion 1 and, therefore, tubes 11 and 12 are kept at their maximum opening point, as previously described, and transmitting all the pressure to the outlet.

When the inlet pressure of the regulator is increased, the outlet pressure increases immediately. When this increased pressure exceeds a certain value, meaning that the outlet pressure is larger than the nominal pressure of regulation, the outlet force will be larger than the force of the spring 55. Thus, the outlet force overcomes the spring force and moves the plunger portion 2 over the inlet portion 1. In this manner, plunger portion 2 totally or partially closes tubes 12 of inlet portion 1 with its sleeves 24, as shown in FIG. 9. When closing tubes 11 and 12, the outlet pressure decreases until it matches the regulating pressure which is when the outlet forces and the spring forces are equivalent.

A similar situation occurs when the volume of the flow decreases downstream of the regulator assembly 10, for example, when a valve is closed. The pressure of the liquid in this situation would increase and, therefore, the outlet pressure of the regulator assembly would also increase, repeating the effect previously described. When the inlet pressure should decrease or if the volume of flow should increase downstream, the outlet pressure would decrease, and the force of the spring 55 would overcome the outlet force, therefore opening the tubes 12 and restoring equilibrium to the system.

The chamber 52, formed between the plunger portion 2 and the fixed piston 4, must be empty of liquids for the plunger portion to slide over the fixed piston correctly. For this reason, a seal 13 has been set on the fixed piston 4. This seal can be any one of the seals usually located between a piston and a sleeve, for example an o-ring, x-ring, quad-ring, polypack, or other type seal. Furthermore, to obtain a regulator assembly with good working precision, it is important that the plunger portion 2 remains placed and that it slides in a coaxial manner in relation to the fixed piston 4 of inlet portion 1. To assure this coaxial sliding, a second supporting element between the fixed piston of piece 1 and the plunger 2 has been added. This supporting element, along with the seal 13 mentioned above, provides two supporting points between the plunger portion 2 and the fixed piston of the inlet portion 1. Having two supporting points, the plunger portion has a coaxial position in relation to the fixed piston of the inlet piece 1; thus, it will slide and it always maintain a coaxial position with respect to inlet portion 1.

Figure 3:
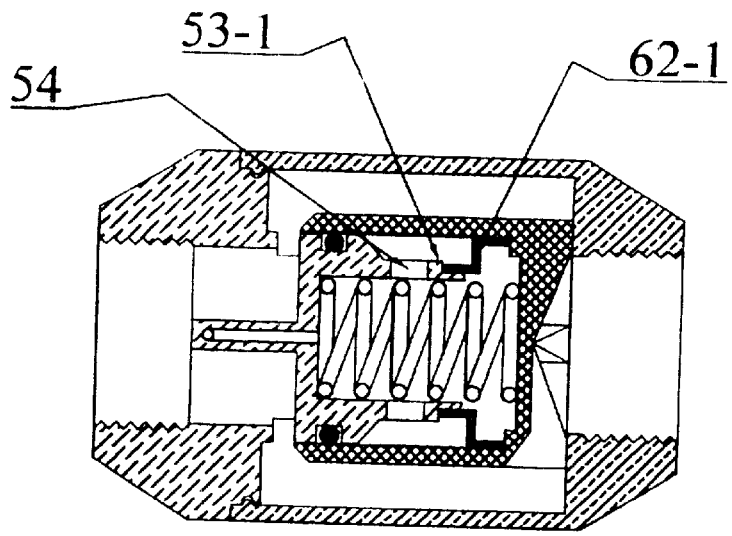
FIG. 3 is a cross-sectional view of a pressure regulator assembly in accordance with a further embodiment of the present invention.
Figure 4:
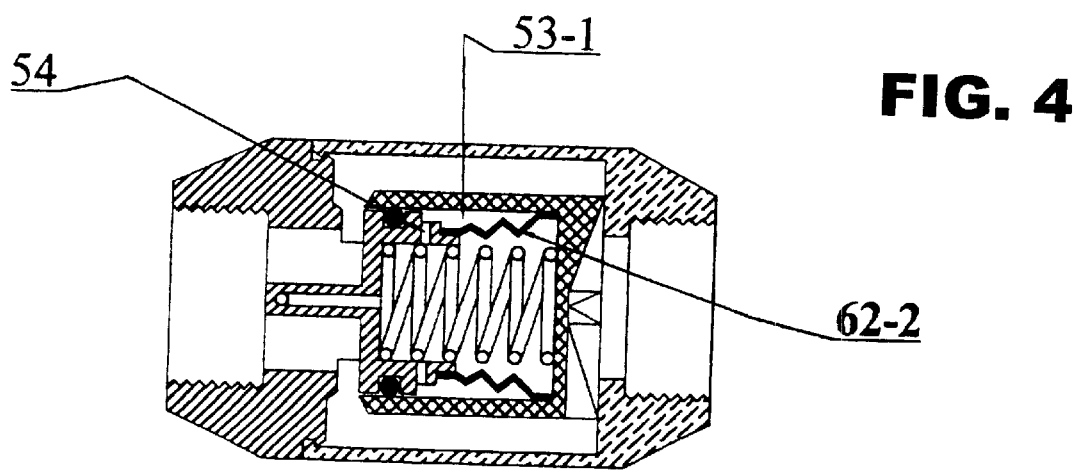
FIG. 4 is a cross-sectional view of a pressure regulator assembly in accordance with a further embodiment of the present invention.
Figure 5:
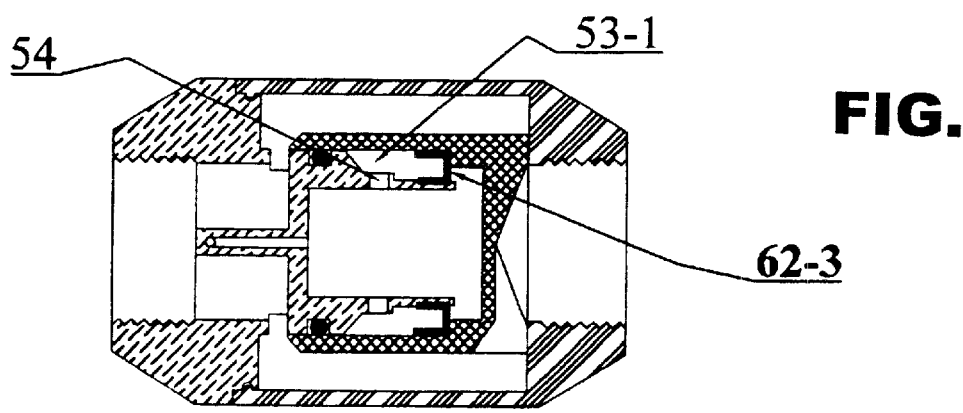
FIG. 5 is a cross-sectional view of a pressure regulator assembly in accordance with a further embodiment of the present invention.

There are several options available for supporting or positioning elements that can work like this supporting element within the scope of the present invention. The most generalized and commonly used element is a single o-ring 14. The o-ring 14 can carry out the supporting purpose, but careful attention must be paid to the fact that the o-ring must not serve as just a seal, but also provides a second support to the plunger. Other elements which may be used besides the o-ring or a bellows 62-2 (FIG. 4) or a diaphragm 62-4 (FIG. 6). Within the different kinds of bellows, it is possible to specify profiles, for example the S-shaped profile 62-1 (FIG. 3), the U-shaped profile 62-3 (FIG. 5), or the L-shaped profile. These elements can carry out the same supporting purpose as the o-ring 14, but have more advantages than using the o-ring. For example, the drawings show that the plunger portion 2 does not slide over the positioning elements 62, as it does over the o-ring 14. FIG. 11, for example, illustrates in detail how these positioning elements 62 function. The fixed piston 111 of the inlet portion is engaged by plunger 112. In addition, for better understanding, reference has been given to the seal 13, chamber 53-1 and tube 54. Shown is the positioning element 62-1 with a S-form, and it is clearly visible to see how the fixing points of this element always remain firmly in place, both in the fixed piston 111 and the plunger 112. When the plunger 112 slides over the fixed piston 111 of the inlet portion 1, the positioning element 62 deforms. However, the plunger 112 never slides over the positioning element as would occur in the case of the o-ring 14. Consequently, the fixing points of the positioning element 62 do not slide. The other positioning elements work in a similar manner, with the exception of the bellows 62-2 (FIG. 4) which compress.

As is shown in the drawings, the separating distance between the plunger portion 2 and the inlet portion 1 remains constant and concentric which provides the coaxial sliding between plunger portion 2 and fixed piston of the inlet portion 1. If there is no sliding between the plunger portion 2 and the positioning element, no friction is produced between the plunger and the positioning element, and the memory of these elements help the plunger portion to return to the original position. Also, any foreign element, like fine sand, does not interfere in the normal working of the plunger portion 2.

The only existing friction is that of the seal 13. In the same manner, the other positioning elements 62 do not produce friction while the plunger portion 2 is sliding. The double support of the plunger portion 2 over the fixed piston of inlet portion 1 remains, but the friction of the second support has been eliminated. In this manner, hysteresis has decreased and the precision of the regulator has increased.

As previously described, o-rings 14 can be used as a supporting element FIG. 2, but in this case the plunger slides over the o-ring 14. The space that exists between the seal 13 and the o-ring 14 or the positioning elements 62, in any of its forms, can accumulate small amounts of liquid that pass through the first seal. This liquid, which is retained between both elements, slows the plunger down when sliding over the fixed piston of inlet portion 1. The slowing down of the normal sliding of the plunger, either when opening or closing, produces a decrease in the precision of the regulator assembly and an increase of hysteresis. To avoid this problem, it is important that none of the positioning elements work as a seal.

The following description describes how to use the o-ring 14 as a positioning element, and then by using the other supporting elements 62. In FIG. 2, we can see that by adding channel 53 and tube 54 which communicates channel 53 with chamber 52 (formed between the posterior part of the fixed piston 4 of the inlet piece 1 and the interior closed side 26 of the plunger 2), chamber 52 has been integrated to both sides of the o-ring 14. By integrating chamber 52 to both sides of the o-ring 14, the o-ring 14 is prevented from working as a seal. In the same manner, FIGS. 3–6 illustrate that the separators 62 show that the space formed between the plunger portion 2 and the separators form a chamber 53-1 which carry out the same purpose as channel 53 with respect to the o-ring 14 as the supporting element. The tubes 54 connect the chamber 53-1 with the chamber 52. In this manner, chamber 52 has been incorporated to both sides of the supportive element 62.

Additionally, chamber 52 is connected to the atmosphere through a tube 19 (FIG. 1), so that it is maintained at atmospheric pressure, therefore preventing the formation of a vacuum or pressures that could affect the normal sliding of the plunger portion 2. The tube 19 eliminates the small quantities of liquid previously mentioned and, therefore, liquid is never retained within the assembly 10. FIG. 12 illustrates a further embodiment of the present invention wherein the tube 19 ventilates chamber 52 to the atmosphere.

It is important to note that the spring 55 pushes the plunger portion 2, separating it from inlet portion 1, therefore maintaining tubes 12 in an open position, as shown in FIGS. 1 and 3–8. The plunger portion 2 ends in a toothed crown 27 on its external side. This toothed crown 27 engages side 32 of the housing portion 3 and correctly positions the plunger portion 2 at the initial point, so that tubes 12 are at their maximum opening point.

The teeth of the crown 27 leave a space large enough for the fluid to pass through freely while the crown engages the housing on its side 32. The teeth have a minimum leaning point on side 32 so that this surface is minimum and insignificant in relation to the effective regulating surface. Therefore, the opposing spring force formed by such surface and the outlet pressure of the regulator is minimized. It is within the scope of the present invention to achieve the same result by installing the toothed crown 27 on side 32 of the housing and by making the closed side of the plunger portion smooth.

The problems presented by a flat closing system in accordance with prior art regulators will be explained below, even though it is not the closing system used in this case, it is illustrated in FIG. 10. When the sides of a plunger and of an inlet portion are flat, as referenced in the background of the present invention, there is an area where the pressure changes from a first point, the internal side of the plunger where there is inlet pressure, to a second point on the external side of the sleeve of the plunger, where there is outlet pressure. In such case, the pressure will decrease progressively along the thickness of the plunger because there is an intermediate pressure between the outlet and the inlet, and this pressure is proportional to the inlet pressure. If the pressure throughout the thickness of the sleeve 24 is the average pressure of the inlet and outlet pressures, then the outlet force opposed to the spring is not constant and varies with the inlet pressure because the surface of the thickness of the plunger would not receive the same pressure on both sides. However, theoretically the pressure at the closing point would have this intermediate pressure while the back side would have an outlet pressure. Consequently, the pressure on the closing side would be greater than the outlet pressure. In addition, the difference between the intermediate pressure and the outlet pressure increases with the inlet pressure. For this reason, the outlet force opposed to the spring decreases while the inlet pressure of the regulator increases. While the outlet force decreases, more pressure is needed to level with the spring force and, consequently, the outlet pressure also increases with the increases of the inlet pressure. For example;

Spring Force=External Surface H Outlet Pressure−Thickness Surface H Intermediate Pressure.

When the intermediate pressure is increased, the only variable that can balance the equation is the outlet pressure H1. Thus, the outlet pressure H1 is directly proportional to the inlet pressure H0. It easy to observe that there cannot be a constant outlet pressure and, therefore, inaccuracy results in the prior art regulators.

In the present invention, there is a double-coned closing between the inlet portion 1 and the plunger portion 2, as shown in FIG. 8. In FIG. 8, the plunger portion 2 closes effectively over the cone seat 15 of the inlet portion 1. In FIG. 9, which corresponds to the closed tube 12, how when making cone 15, an effective closing is obtained.

It also can been seen how an outlet pressure H1 is obtained throughout the entire thickness of the plunger 2 as a result of the profile of cone 25 of the sleeve 24 of the plunger 2, as shown in FIG. 9. For the closing to be effective, the cone front 15 and the profile cone 25 of the plunger portion must be inverted to each other to permit the plunger portion to fit inside or outside the cone seat 15, as shown in FIGS. 8 and 9.

FIGS. 7a and 9 show how the pressures are divided at the closing point. There is an inlet pressure H0 in the tubes 12 and an outlet pressure 111 in the rest of the regulator. Therefore, the outlet pressure will be on both sides of the surface of the thickness of the plunger portion. Because the outlet pressure is regulated, the outlet force opposed to the spring will be constant. Consequently, the outlet pressure will be constant and accuracy of the pressure regulator assembly in accordance with the present invention is achieved.

The equation introduced before is as follows:

Spring Force=External Surface H Outlet Pressure−Thickness Surface H Outlet Pressure This permits that the outlet pressure is uniform in the regulator assembly.

The present invention has been described and, with the solutions presented, it is possible to make a pressure regulator assembly which is more effective than existing pressure regulators and which is simpler, smaller, has fewer pieces, and is less expensive to manufacture.

I claim:

1. A liquid pressure regulator assembly, including in combination:

an inlet portion through which the liquid enters the regulator assembly and which is structurally arranged to connect to a source of liquid, said inlet portion including a passageway which permits the liquid to pass through said inlet portion, with said inlet portion including a piston member extending therefrom;

a sliding plunger portion having a cylinder portion structurally arranged to be located over said piston member of said inlet portion, with said cylinder portion having a closed end with a toothed crown positioned thereon and an open end defined by a cylindrical sleeve having an annular end structurally arranged to engage said inlet portion to block said passageway, with said annular end having a conically shaped profile;

a housing portion surrounding said plunger portion and arranged to sealingly engage said inlet portion, said housing and portion being structurally arranged to connect to a discharge device;

a spring member located between said inlet portion and said plunger portion to bias said plunger portion to an operating position away from said inlet portion wherein said passageway is open;

at least two separated support members positioned between said piston member of said inlet portion and said cylinder of said plunger portion, with one of said supports providing a front seal member;

communication tube members positioned between the space formed between said separating support members and the cavity defined by said piston member within said sliding plunger and between said cavity and the atmosphere; and a sealing means located between said piston member of said inlet portion and said plunger portion, said sealing means being provided by a frustoconical profile on said inlet portion engaging a conical profile on said annular end of said cylindrical sleeve to close said passageway.

2. A liquid pressure regulator in accordance with claim 1, wherein said frustoconical profile on said inlet portion and said conical profile on said cylindrical sleeve end of same plunger portion are inverted with respect to each other.

3. A liquid pressure regulator in accordance with claim 1, wherein said at least two separated support members are o-rings.

4. A liquid pressure regulator in accordance with claim 1, wherein one of said separated support members has a S-shaped profile.

5. A liquid pressure regulator in accordance with claim 1, wherein one of said separated support members has an U-Shaped profile.

6. A liquid pressure regulator in accordance with claim 1, wherein one of said separated support members has a diaphragm profile.

7. A liquid pressure regulator in accordance with claim 1, wherein one of said separated support members has a bellows profile.

8. A liquid pressure regulator in accordance with claim 1, wherein said frustoconical profile on said inlet portion is provided by a shoulder on said inlet portion.

9. A liquid pressure regulator in accordance with claim 1, wherein said piston member is integral with said inlet portion.

10. A liquid pressure regulator in accordance with claim 1, wherein said passageway in said inlet portion is L-shaped.

11. A liquid pressure regulator in accordance with claim 1, wherein said at least two separated support members are positioned on the peripheral surface of said piston member.

* * * * *